Patented May 17, 1927.

1,628,931

UNITED STATES PATENT OFFICE.

PAUL H. TODD, OF KALAMAZOO, MICHIGAN, ASSIGNOR TO RENARD, INC., OF KALAMAZOO, MICHIGAN, A CORPORATION OF MICHIGAN.

PROCESS FOR TREATING WAXED AND PRINTED PAPERS.

No Drawing.  Application filed September 13, 1926. Serial No. 135,281.

The object of this invention is to provide an improved process for the extraction of wax from waste waxed paper, simultaneously with the deinking of the same.

In the past, wax has been extracted from old waxed papers by dissolving it out with volatile solvents, such as naphtha, gasoline, carbon-tetra-chloride. In dissolving the wax with such solvents, a considerable amount of ink and other impurities are also dissolved and remain in the wax after the volatile solvent has been distilled off. These impurities are somewhat difficult to remove.

I have found that by heating the waxed paper in a solution of tri-sodium-phosphate, either alone or in conjunction with other alkaline materials such as sodium carbonate, a considerable portion of the wax can be separated from the paper and rises to the surface more or less emulsified and can be skimmed off from the surface of the solution in which the paper is heated.

I have also found that the ink used on ordinary waxed bread wrappers, for instance, is almost completely removed from the pulp of the paper, and held in solution in the water containing the tri-sodium phosphate. The process, therefore, separates the wax from the ink. From one-half to two-thirds of the total wax content of ordinary waxed wrapping paper can be readily removed by this process.

In practice, a satisfactory method is to immerse the waxed paper in about ten times its weight of a five per cent solution of tri-sodium-phosphate, though a much weaker solution can be used with good results, the principal difference being that the dewaxing and deinking action is not so rapid. The papers are heated or boiled in this solution for a few minutes, and agitated. The liberated wax will tend to accumulate on the surface of the solution, owing to its lower specific gravity. It can be skimmed off from the surface of the solution or it can be flowed off into suitable receptacles for purification by the usual methods for purifying paraffin wax. The ink is dissolved in the solution and thus separated.

It is possible to substitute soda ash, otherwise known as sodium carbonate, for a part of the tri-sodium-phosphate. A mixture of one part by weight of soda ash to two parts of tri-sodium-phosphate works very well when substituted for the pure tri-sodium-phosphate. Similarly, other alkaline salts may be substituted for a part of the tri-sodium-phosphate.

It has also been found that tri-sodium-phosphate, alone or mixed with other alkaline salts, has considerable deinking power when used in solution in water for treatment of ordinary waste papers.

Having thus described my invention, what I claim as new and desire to secure by Letters Patent, is:

1. The process of treating printed waxed papers consisting in submerging the same in a solution of tri-sodium phosphate, and heating with agitation to cause the wax to rise to the surface and the ink to be dissolved, as specified.

2. The process of treating printed waxed papers consisting in submerging the same in a solution of tri-sodium phosphate and soda ash, and heating with agitation to cause the wax to rise to the surface and the ink to be dissolved, as specified.

3. The process of treating printed papers consisting in submerging the same in a solution of tri-sodium phosphate, and heating with agitation to cause the ink to be dissolved, as specified.

4. The process of treating printed papers consisting in submerging the same in a solution of tri-sodium phosphate and soda ash, and heating with agitation to cause the ink to be dissolved, as specified.

5. The process of treating printed papers consisting in submerging the same in a solution of tri-sodium phosphate and an alkaline material, and heating with agitation to cause the ink to be dissolved, as specified.

6. The process of treating waxed papers consisting in submerging the same in a solution of tri-sodium phosphate, and heating with agitation to cause the wax to rise to the surface, as specified.

7. The process of treating waxed papers consisting in submerging the same in a solution of tri-sodium phosphate and soda ash, and heating with agitation to cause the wax to rise to the surface, as specified.

8. The process of treating waxed papers consisting in submerging the same in a solution of tri-sodium phosphate and an alkaline material, and heating with agitation to cause the wax to be dissolved, as specified.

9. The process of treating printed waxed papers consisting in submerging the same in a solution of tri-sodium phosphate and an alkaline material, and heating with agitation to cause the wax to rise to the surface and the ink to be dissolved, as specified.

In witness whereof I have hereunto set my hand.

PAUL H. TODD.